United States Patent

[11] 3,524,436

[72] Inventor Anton Braun
    Minneapolis, Minnesota
    (6421 Warren Ave., Edina, Minnesota 55435)
[21] Appl. No. 829,329
[22] Filed June 2, 1969
    Division of Ser. No. 805,063, filed Dec. 17, 1968, which is a continuation of Ser. No. 728,078, filed May 9, 1968, which is a continuation of Ser. No. 669,353, filed Sept. 12, 1967, which is a continuation-in-part of Ser. No. 619,374, filed Feb. 28, 1967, abandoned, which is a continuation-in-part of Ser. No. 584,710, filed Oct. 6, 1966, abandoned.
[45] Patented Aug. 18, 1970

[54] FREE PISTON ENGINE APPARATUS
    18 Claims, 10 Drawing Figs.
[52] U.S. Cl. .................................................. 123/46,
                                                74/110, 230/56
[51] Int. Cl. .................................................. F02b 71/00,
                                                F04b 31/00, F16b 21/44
[50] Field of Search .......................................... 123/46,
    46B, 46S.C., 46A, 46E; 230/56, 56A; 74/110

[56] References Cited
    UNITED STATES PATENTS
    947,908   2/1910   Heglar ........................  74/29
    1,640,655 8/1927   Hartman et al. ..............  74/110
    2,027,877 1/1936   Pescara ........................  230/56
    2,125,013 7/1938   Charles ........................  123/46UX
    2,244,215 6/1941   Pescara ........................  74/110
    2,510,127 6/1950   Mercier ........................  230/56
    2,772,574 12/1956  Thomas ........................  74/110
    2,814,551 11/1957  Broeze et al. .................  23/1
    2,991,773 7/1961   Cadiou ........................  123/46
    3,318,089 5/1967   Beukering et al. ............  60/24
    FOREIGN PATENTS
    73,018    4/1960   France ........................  230/56

Primary Examiner—Wendell E. Burns
Attorney—Frederick E. Lange and William C. Babcock ABSTRACT: Synchronization apparatus for synchronizing and balancing free piston engines, comprising racks, that are attached to one end of a shaft which has its other end attached to and carried by a piston assembly, each of the racks having teeth engageable with the teeth of a pinion mounted for rotation and fixed within and relative to the engine housing. The teeth of each of the pinions also engage the teeth of another rack attached to and carried by a piston or counter-balancing weight. The racks and pinions are arranged so that when the piston assembly, and thus the shaft, move in one direction in the engine, the other racks and the piston or weight move in the opposite direction in the engine. The specific arrangement of the racks and pinions minimize the frictional losses in the synchronizer.

Patented Aug. 18, 1970

3,524,436

INVENTOR.
ANTON BRAUN
BY
John J. Held, Jr.
ATTORNEY

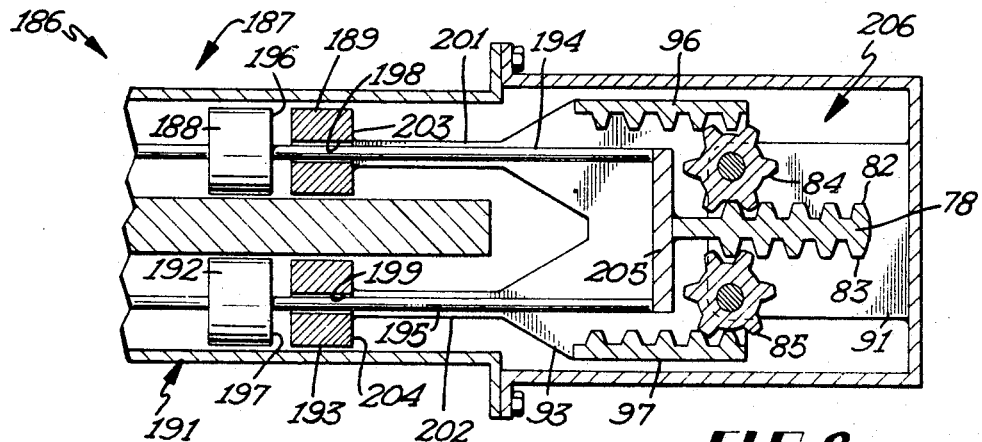
FIG 8
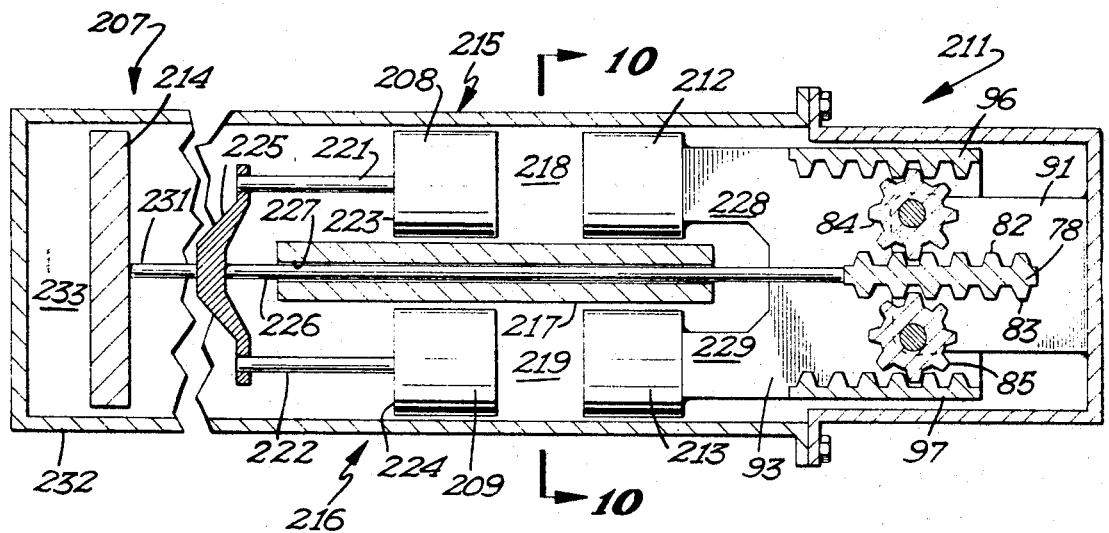
FIG 9
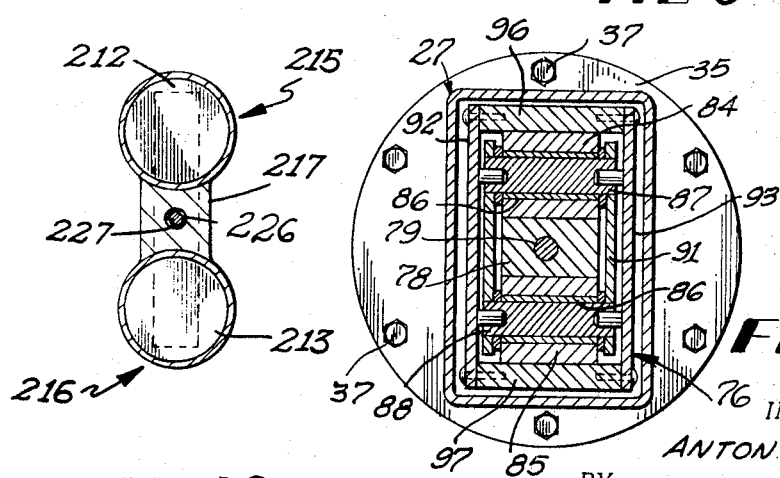
FIG 10
FIG 4
INVENTOR.
ANTON BRAUN
BY
John J. Held, Jr.
ATTORNEY

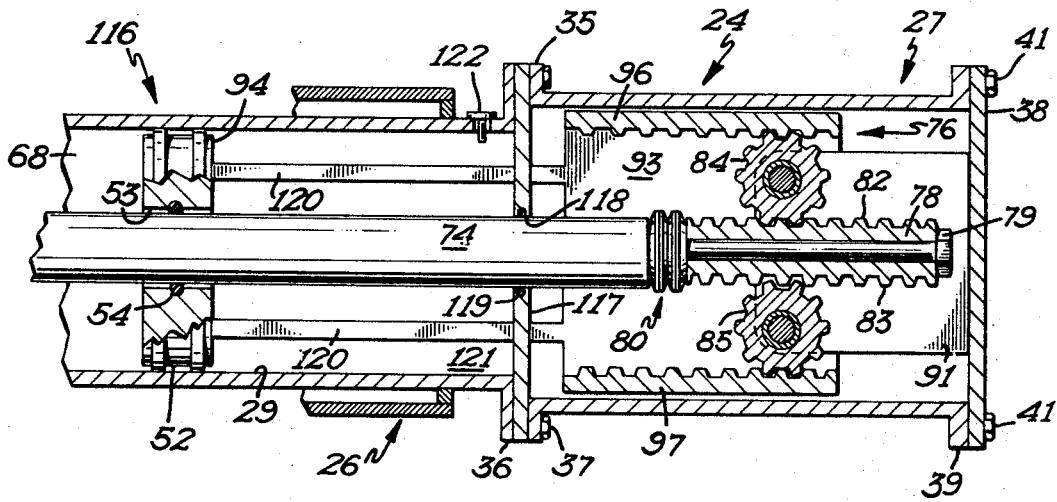
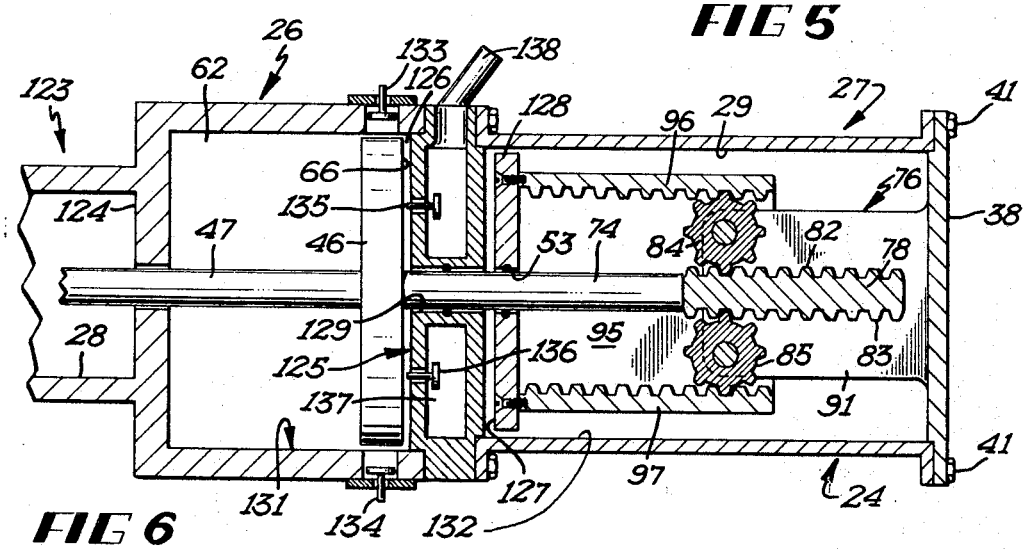
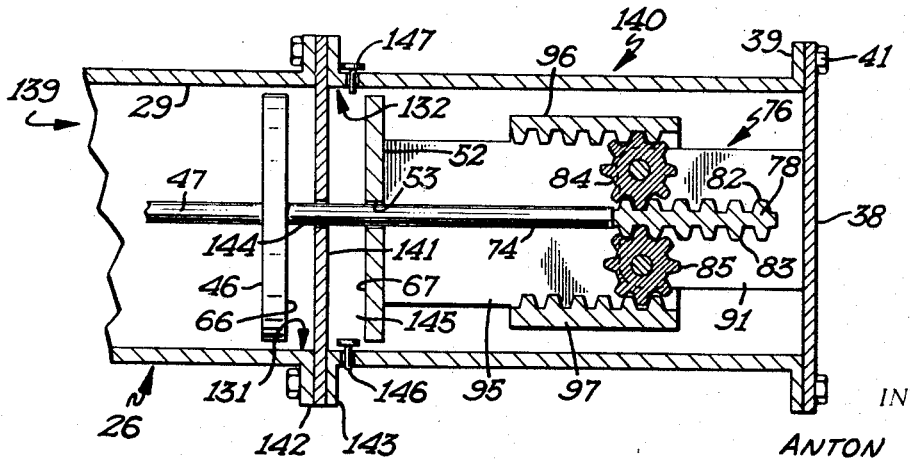

FREE PISTON ENGINE APPARATUS

CROSS REFERENCES

This is a division of application 805,063 filed December 17, 1968, which was a continuation of application 728,078 filed May 9, 1968, now abandoned, which was a continuation of application 669,353 filed September 12, 1967, now abandoned, which was a continuation in part of application serial number 619,374 filed February 28, 1967, now abandoned, which was a continuation in part of application 584,710 filed October 6, 1966, now abandoned.

BACKGROUND

This invention relates to improved synchronization apparatus for synchronizing and balancing free piston engines.

Generally, free piston engines have included a pair of opposed, axially aligned pistons which may reciprocate within a cylinder, and which are designed and arranged in the cylinder so as to define a combustion chamber between the pistons and a compression chamber at each end of the cylinder. To achieve optimum operating characteristics, the free piston engines have utilized various means to synchronize the reciprocatory movement of the pistons, including a variety of arrangements of linkages and racks and pinions.

One of the primary advantages of free piston engines is that theoretically, the weight and over-all size of these engines may be reduced, as compared to the weight and size of a conventional crank type engine of the same class or same power output operating at the same speeds. This reduction of weight and size is possible because many of the forces and force moments developed in conventional crank type engines in transforming the reciprocating forces of the pistons into useful output work do not have to be present in free piston engines, due to their design.

However, in spite of its theoretical size and weight advantage, the successful commercial exploitation of free piston engines has been hindered by a number of problems. One such problem was that, for one reason or another the prior, commercially available free piston engines, and particularly free piston engine-compressors, have not been appreciably lighter or more compact than comparable crank type engine-compressors. The design and arrangement of the synchronizers that have been heretofore used have limited the extent to which weight and size could be reduced.

Another problem in designing successful free piston engines is that in some engines relatively large forces must be transmitted through the synchronizer, thereby causing the synchronizer itself to be of a relatively heavy construction. In addition to increasing the size and weight of the engine, these synchronizers also dissipate, through friction, a significant portion of the otherwise useful output energy of the engine and thereby lower the over-all efficiency of the engine.

SUMMARY

Briefly, the novel and improved free piston engine synchronization apparatus of the present invention overcomes the above mentioned and other problems associated with synchronizing and balancing the movement of oppositely moving assemblies in a free piston engine.

The apparatus is an extremely compact unit which does not increase the over-all width or height of the engine, although it may slightly increase the over-all length of the engine. A preferred embodiment of synchronization apparatus, according to the present invention includes racks, which are arranged to be connected to one end of an axial shaft which is connected at its other end with a piston assembly. The racks are arranged symmetrically about the extension of the longitudinal central axis of the shaft and include first and second racks which are mounted in back-to-back relationship. The teeth of the first and second racks project outwardly away from each other to engage the teeth of first and second pinions, respectively. The pinions are mounted for rotation on axes fixed and supported within a housing on the engine. Third and fourth racks are supported by a frame member with the teeth of the third and fourth racks projecting inwardly toward each other so that the teeth of the third and fourth racks also engage the teeth of the first and second pinions, respectively. The frame member includes a pair of wall members which support the third and fourth racks and which are positioned adjacent the sides of the first and second racks and first and second pinions. The third and fourth racks are supported so that there is no relative movement between the third and fourth racks and between these racks and the frame member and so that sliding engagement between these racks and any adjacent fixed surfaces may be eliminated. By this arrangement of racks and pinions, the substantial normal forces resulting from the engagement of the teeth of the racks and pinions do not and cannot cause any loss of energy, due to friction, since there is no sliding contact caused by these normal forces between the racks of the synchronizer and any other relatively fixed member since these normal forces are completely balanced in the synchronizer.

Accordingly, it is the primary object of the present invention to provide novel synchronization apparatus for free piston engines.

Another object of the present invention is to provide an improved synchronizer for synchronizing the movement of piston assemblies in a free piston engine, which synchronizer is arranged to be connected to both piston assemblies.

Another object of the present invention is to provide an improved free piston engine synchronization apparatus for synchronizing and balancing the relatively opposed movement of a piston assembly and a counter-balancing movable weight within the engine, where a portion of the synchronization apparatus forms at least part of the counter-balancing movable weight.

Another object of the present invention is to provide improved free piston engine synchronization apparatus for synchronizing the movements of all pistons in a multicylinder free piston engine.

Still another object of the present invention is to provide improved synchronization apparatus for synchronizing and balancing the movement of oppositely moving assemblies in a free piston engine, which synchronizer includes first and second racks, which are arranged to be connected to one end of an axial shaft which is connected at its other end with a piston assembly; first and second pinions mounted for rotation on the engine housing adjacent the first and second racks, respectively, so that the teeth of the pinions engage the teeth of the adjacent racks, and frame means supporting third and fourth racks which are arranged so that the teeth of the third and fourth racks also engage the teeth of the first and second pinions, respectively; the frame means includes a pair of wall members which support the third and fourth racks and which are positioned adjacent the sides of the first and second racks and first and second pinions and which support the third and fourth racks so that there is no relative movement between these racks or between these racks and the frame means and so that the normal forces resulting from the engagement of the teeth of the racks and the pinions do not cause any significant energy losses due to friction whereby sliding contact between the racks and any adjacent relatively fixed surfaces may be eliminated. A related object of the present invention is to provide improved synchronization apparatus of the type described wherein there may be relative movement between the first and second racks and the pinions and between the third and fourth racks and the pinions.

These and other objects and advantages of the present invention will become apparent from the following description of the preferred embodiments of this invention described in connection with the accompanying drawings.

DESCRIPTION OF THE DRAWINGS

FIGURE 4 is a cross-sectional view of a synchronizer taken along the section line 4-4 in FIGURE 1;

FIGURE 5 is a schematic cross-sectional view of a further embodiment of an engine using a synchronizer according to the present invention, taken along the central longitudinal axis of the engine;

FIGURE 6 is a schematic cross-sectional view of a further embodiment of an engine using an apparatus according to the present invention, taken along the central longitudinal axis of the engine, where the apparatus synchronizes the relative movement of a piston assembly and a counter-balancing movable weight associated with a portion of the apparatus;

FIGURE 7 is a schematic, cross-sectional view of the compressor section of a still further embodiment of an engine using apparatus according to the present invention, taken along the central longitudinal axis of the engine, which embodiment is similar to that shown in FIGURE 6;

FIGURES 8 and 9 are schematic cross-sectional views of still other embodiments of engines using a synchronizer according to the present invention, which engines include a plurality of power cylinders and synchronizers generally similar to that shown in FIGURE 1; and FIGURE 10 is a vertical cross-sectional view of the engine of FIGURE 9 taken along sectional lines 10-10 in FIGURE 9.

Figure 1:
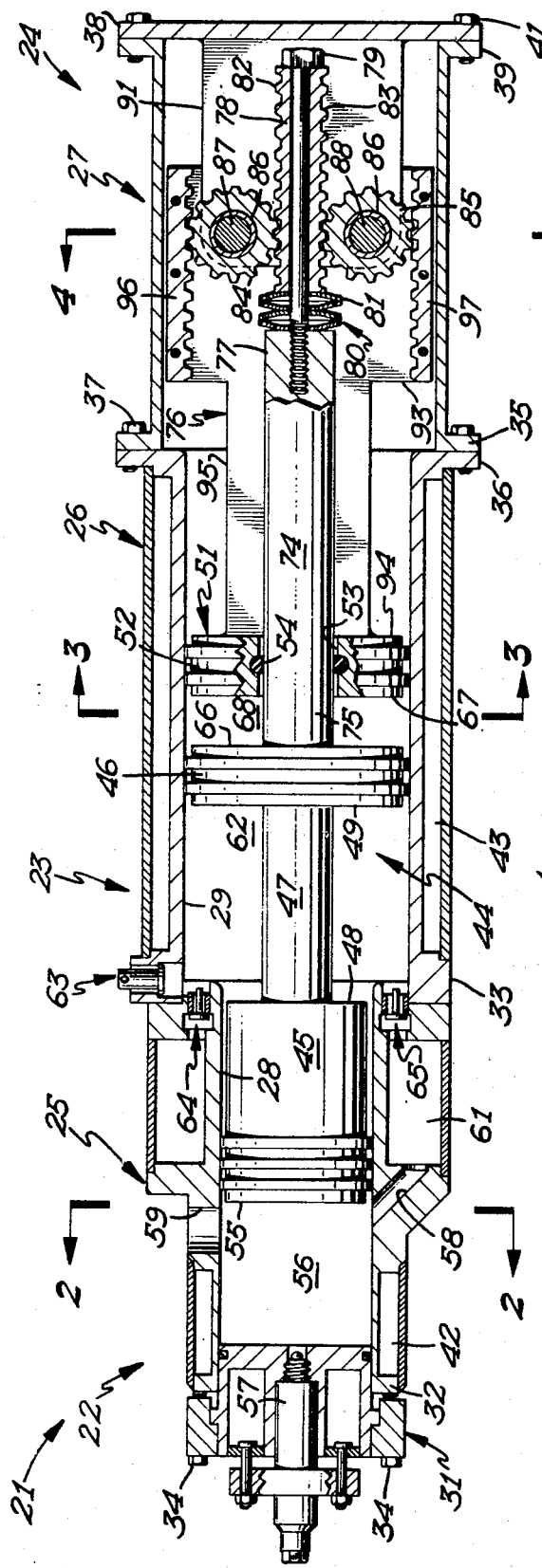
FIGURE 1 is a vertical cross-sectional view of an embodiment of a free piston engine using the improved synchronization apparatus of the present invention, taken along the central longitudinal axis of the engine, with some parts of the engine being shown broken away and others shown in elevation and with the piston assemblies being shown at one end of their strokes.

Throughout the various FIGURES of the drawings, the same numerals will be used to designate the same parts in the various engines. Moreover, when the terms "right," "left," "right end" and "left end" are used herein, it is understood that these terms have reference to the structure shown in the drawings as it would appear to a person viewing the drawings.

DESCRIPTION

FIGURES 1-4

One embodiment of a free piston engine using a synchronizer according to the present invention is shown at 21 in FIGURE 1. The engine 21 includes three basic functional components, that is, a combustion component, shown generally at 22, a compressor component, shown generally at 23, and a synchronizer component, shown generally at 24.

More specifically, the engine 21 comprises an end, cylindrical housing 25, a central, cylindrical housing 26 and a generally rectangular, in cross-section, synchronizer housing 27. The housings 25 and 26 have central coaxial bores 28 and 29 respectively formed therein which extend completely through the housings. In the engine shown in FIGURE 1, the diameter of bore 28 is smaller than the diameter of bore 29.

A cylinder head 31 closes and slightly fits within the left end 32 of bore 28. The cylinder head 31 and the end housing 25 are both fastened to the left flanged end 33 of the center housing 26 by a plurality of threaded bolts or tie-rods 34.

The left flanged end 35 of the synchronizer housing 27 is fastened to the right flanged end 36 of the central housing 26 by bolts 37. A cover plate 38 closes the open right end 39 of the synchronizer housing 27 and is fastened to the end 39 by bolts 41.

Thus, in view of the above structure it is apparent that the engine 21 may be completely disassembled by the simple expedient of removing bolts 34, 37 and 41.

To permit cooling of the engine, generally annular cooling chambers or cavities 42 and 43 are formed in the housings 25 and 26, respectively, through which coolants may be circulated. Since conventional coolant circulating systems, may be utilized with the engine 21, further details of the engine coolant system are not shown in the drawings or described herein.

A piston assembly, shown generally at 44, is positioned, for reciprocal movement, in bores 28 and 29. The piston assembly 44 includes a piston 45 which is positioned in bore 28 and a piston 46 which is positioned in bore 29. The pistons 45 and 46 may be of conventional design and construction and may include piston rings to prevent gases from leaking between the pistons and their respective bores during reciprocal movement of the pistons. A rod 47, extending from the inner face 48 of the piston 45 to the outer face 49 of the piston 46, interconnects the pistons 45 and 46 so that the pistons move together in the engine as a unit.

A second piston assembly 51 is positioned for reciprocal movement in bore 29 and includes a piston 52 which is generally similar in construction and diameter to piston 46. However, for reasons hereinafter explained, piston 52 has an axial aperture 53 formed therein. A conventional sealing ring 54 is carried in a groove formed about the periphery of the aperture 53.

The outer face 55 of the piston 45 and cylinder head 31, together with the bore 28, define an internal combustion chamber 56. In engine 21, a combustion of a fuel-air mixture in the chamber 56 results from the compression of the air or the fuel-air mixture between the outer face 55 of piston 45 and the cylinder head 31, in accordance with the principles of operation of conventionsl internal combustion engines. In the case of a diesel engine, a conventional fuel injector unit 57 is carried by the cylinder head 31 and communicates with the chamber 56. Of course, combustion of the fuel-air mixture in chamber 56 may also be accomplished by the use of a conventional spark plug and accompanying conventional ignition system.

Figure 2:
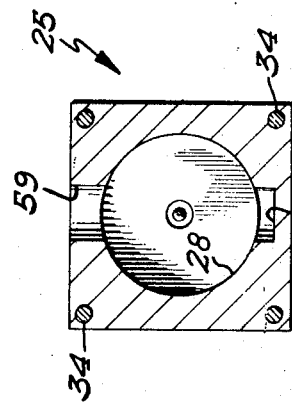
FIGURE 2 is a cross-sectional view of the engine taken along the section line 2-2 in FIGURE 1.

Referring to FIGURES 1 and 2, air under pressure is introduced into the chamber 56 through one or more intake ports, one being shown at 58 and the hot combustion gases are exhausted from the chamber 56 through an exhaust port 59. The ports 58 and 59 are arranged, relative to the chamber 56, so that the chamber 56 will be "loop-scavenged" during normal operation of the engine 21. The flow through the ports 58 and 59 is controlled by the piston 45.

A generally annular scavenge air chamber 61 is formed in the housing 25 and the intake port 58 communicates with the chamber 61 so that when the piston 45 is not blocking the port 58, air from chamber 61 flows through port 58 and into chamber 56, as more fully explained hereinafter.

A second air chamber 62 is defined by the inner face 48 of piston 45 and the outer face 49 of the piston 46 together with bore 29. Air is drawn into chamber 62 through a conventional one-way valve, shown schematically at 63, mounted in the housing 26 while the piston 46 moves to the right in bore 29. The air in chamber 62 is forced into chamber 61 by the piston 46 through conventional one-way valves, shown schematically at 64 and 65, when the piston assembly 44 moves to the left from the position shown in FIGURE 1. In view of the difference in the diameters of bores 28 and 29, air is introduced into chamber 61 from chamber 62 under pressure. Moreover, the volumes of chambers 61 and 62 and the dimensions of ports 58 and 59 are selected so that the pressure of the air in chamber 61 and port 58 is greater than the pressure of the gases in chamber 56 when the piston 45 is not blocking port 58.

Figure 3:
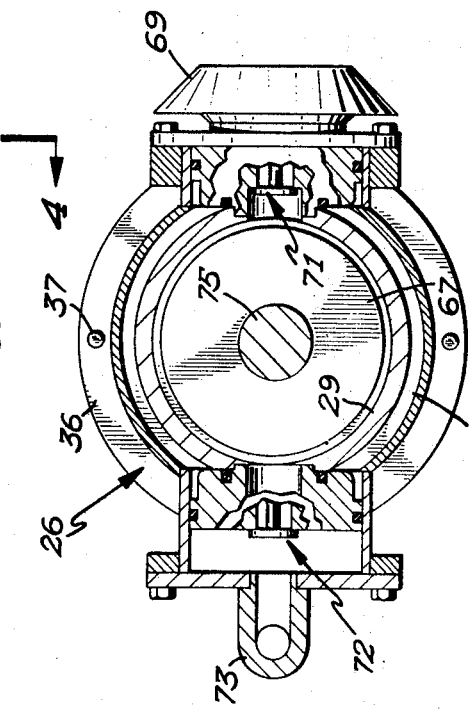
FIGURE 3 is a cross-sectional view of the engine taken along the section line 3-3 of FIGURE 1.

Referring now to compressor component 23 of the engine 21, the inner faces 66 and 67 of the pistons 46 and 52, respectively, together with the bore 29, define a compressor chamber 68 between the pistons 46 and 52. As shown in FIGURE 3, air is drawn into the compressor chamber 68 through a conventional air filter 69 and one-way valve, shown schematically at 71, as the pistons 46 and 52 move away from each other in the bore 29. As the pistons 46 and 52 move toward each other in bore 29, air in the compressor chamber 68 is compressed to a predetermined pressure and is expelled under pressure, from the compressor chamber through a conventional one-way valve, shown schematically at 72 and manifold 73.

The synchronizer component 24 of the engine 21 is generally positioned at the right end of the engine and as more fully explained hereinafter, is designed to transmit the instantaneous differential forces acting on the piston assemblies from one piston assembly to the other with a minimum loss of energy, due to friction, in the transmission of these forces.

More specifically, the synchronizer component 24 includes a shaft 74 which is secured at one end 75 to the inner face 66 of piston 46 and which penetrates or projects into and through the aperture 53 formed in the piston 52. The outer diameter of the shaft 74 is selected so as to prevent leakage of air between the shaft and the piston 52 while minimizing friction therebetween, during relative movement between the shaft and the piston 52. Furthermore to avoid creation of side forces, the central longitudinal axes of the bores 28 and 29, the piston assemblies 44 and 51 and the shaft 74 are coaxial.

A synchronizer mechanism 76 is connected to the projecting end 77 of the shaft 74. The mechanism 76 includes a double-rack block 78 which is mounted on the projecting end 77 of the shaft 74 by means of a threaded pin 79 that extends through a central bore in block 78 and is threaded into the end 77 of the shaft. A shock absorbing assembly 80 is carried by the pin 79 between the block 78 and the end 77. The assembly 80 includes several sets of conventional springs 81 arranged in back-to-back nesting contact such as, for example, "Belleville" type springs. The shock absorbing assembly 80 permits limited movement of the block 78 along the pin 79, relative to the end 77 of shaft. The purpose of this relative movement is to permit the absorption of any shocks or excessive forces imposed on the synchronizer mechanism 76, for instance, during engine start-up.

Referring now to FIGURES 1 and 4, racks 82 and 83 are formed on the upper and lower surfaces of the block 78, respectively, so that the teeth of the racks 82 and 83 project from the block 78 in opposite directions, that is, substantially radially outwardly from the central longitudinal axis of the pin 79 and thus, of the shaft 74. The racks 82 and 83 may be of conventional design and the teeth thereof may have a conventional profile.

A pair of pinions 84 and 85 are positioned adjacent the block 78 so that the teeth of the pinions 84 and 85 engage the teeth of the racks 82 and 83, respectively. The teeth of the pinions are of meshing design and profile to the teeth of racks 82 and 83. Pinions 84 and 85 are mounted on bushings 86 for rotation about horizontally disposed shafts 87 and 88, respectively. The ends of the shaft 87 and 88 are carried by a pair of parallel, vertically arranged brackets 89 and 91 which are secured to the plate 38.

A pair of movable wall members 92 and 93 are positioned adjacent to and parallel with the brackets 89 and 91, respectively.

The wall members are connected with the outer face 94 of the piston 52 by means of integral extensions, one of which is shown at 95, of the wall members whereby the wall members 92 and 93 and the piston 52 move together as a unit.

A second pair of racks 96 and 97 are carried by and positioned between the upper and lower ends of the wall members 92 and 93, as shown in FIGURES 1 and 4. The teeth of the racks 96 and 97 are of meshing design and profile to the teeth of the pinions 84 and 85. The racks 96 and 97 are positioned between wall members 92 and 93 so that the teeth of the racks 96 and 97 engage the teeth of the pinions 84 and 85, respectively, whereby movement of the piston 52 and thus the racks 96 and 97 in one direction causes rotational movement of the pinions 84 and 85. This rotational movement of the pinions, in turn, moves the double-rack block 78, and thus the shaft 74, and the piston assembly 44, in the opposite direction. In other words, the racks 82, 83, 96 and 97 and pinions 84 and 85 are arranged such that when the racks 96 and 97 are moved in one direction, the racks 82 and 83 are moved in the opposite direction and vice versa.

As noted above, the synchronizer mechanism 76 is capable of transmitting relatively large instantaneous differential forces acting on the piston assemblies 44 and 51 from one assembly to the other, with minimal losses due to friction. This minimal frictional loss in the synchronizer mechanism is due to the arrangement of the mechanism 76, and more particularly, to the arrangement of the racks 82, 83, 96 and 97 and the pinions 84 and 85 which eliminates the necessity of sliding contact between the movable racks and fixed bearing surfaces and thus eliminates a major cause of frictional losses in the synchronizers as heretofore utilized with free piston engines. In other words, the arrangement of the mechanism 76 completely cancels the effect of the normal component of the forces created by the engagement between the teeth of the racks and the pinions. Furthermore, frictional losses in the mechanism 76 are further reduced since the double-rack block 78 and racks 96 and 97 are self-aligning in that they inherently seek a position relative to the pinions 84 and 85 in which the forces created by the meshing of the teeth of the pinions and the racks 82 and 84 and also the racks 96 and 97 are minimized.

OPERATION

FIGURES 1-4

The operation of the engine 21 may be summarized as follows: In FIGURE 1, the piston assemblies 44 and 51 are shown at their inner-most position. Even though air is expelled from the compressor chamber 68 through the valve 72, the energy in the compressed air remaining in chamber 68 is sufficient to stop the inward movement of the pistons 46 and 52 and subsequently to force these pistons to move apart again, so that the inner faces 66 and 67 of the pistons 46 and 52 are prevented from contacting each other. As noted above, because of the synchronizer mechanism 76, the movement of piston 46 is the mirror image of the movement of piston 52. As the pistons 46 and 52 move outwardly in bore 29 from the position shown in FIGURE 1, the piston 45 is also moved toward the left in bore 28. As piston 45 moves in the bore 28, it blocks ports 58 and 59 and compresses the air or fuel-air mixture in chamber 56. The compression of the air or fuel-air mixture in chamber 56 continues until the piston 45 reaches the outer end of its stroke. Combustion in chamber 56 forces the piston 45 and thus the piston 46 to move toward the right in bores 28 and 29, respectively. Again, because of mechanism 76, the piston 52 is forced to move to the left in bore 29. The pistons 46 and 52 move inwardly toward each other until they again assume the position shown in FIGURE 1. Thereafter the above cycle of operation is again repeated.

As previously noted, during the leftward movement of the piston 46 air is forced from chamber 62 into the scavenge air chamber 61 through valves 64 and 65. The pressure of the air in chamber 61 is increased so that when the piston 45 again uncovers first the port 59 and then port 58, that is, after combustion in chamber 56, the air in chamber 61 scavenges chamber 56. Moreover, when the piston 46 is moved to the right, atmospheric air is drawn into the chamber 62 through valve 63.

Also during the above cycle of operation, atmospheric air is drawn into the compressor chamber 68 through valve 71, compressed therein and expelled from the compressor chamber through the valve 72. Of course, the compressed air expelled from compressor chamber 68 may be utilized in any manner.

As noted above, one of the advantages of the improved free piston engine of this invention is that substantially vibrationless operation may be easily achieved. However, vibrationless operation is only possible if the sum of the product of the mass of the piston assembly 44, the shaft 74 and the block 78 times the distance through which these elements move plus the product of the mass of the piston assembly 51, wall members 92 and 93 and racks 96 and 97, times the distance through which these elements move is equal to zero. In other words, the mass of the elements moving in one direction in the engine times the length of their stroke must be equal to the mass of the elements moving in the opposite direction in the engine times the length of their stroke. In the most common case, the masses of the two oppositely moving elements will be equal and the length's of their strokes will be equal, but, of course, this is not necessary.

Lastly, it should be noted that an engine, such as shown in FIGURES 1-4, has been constructed and has been operated, on an experimental basis. This engine has an over-all length of 35 inches as measured between the members corresponding to cylinder head 31 and plate 38 and has a maximum width of 8 inches and maximum height of 10 inches, as measured in the cross-section shown in FIGURE 3. The overall weight of the engine is approximately 160 pounds, not including the test instrumentation presently mounted on the engine. The output of the compressor component of the engine has been measured at approximately 80 c.f.m. with the engine running at less than 1800 cycles per minute.

FIGURE 5

Engine 116 may be identical to engine 21 both in structure and mode of operation, except that engine 116 has a bouncer chamber formed between the piston 52 and the synchronizer mechanism 76. More specifically, a wall 117 is clamped between the end flanges 35 and 36 and extends across the right end of the bore 29 so that the bore 29 is isolated from the interior of the synchronizer housing 27. The wall 117 includes a central aperture 118 through which the shaft 74 projects. A conventional sealing ring 119 is carried by the wall 117 adjacent the aperture 118 so as to prevent leakage of air between the wall 117 and the shaft 74 during relative movement therebetween.

Instead of the extensions 95, the wall members 92 and 93 are connected with the outer face 94 of the piston 52 by a plurality of relatively thin arms 120 which are spaced from the central longitudinal axis of the shaft 74. Sealed apertures, not shown, are formed in the wall 117 through which the arms 120 project.

The wall 117 and the outer face 94 of the piston 52, together with the bore 29, define a bouncer chamber 121. A check valve, shown schematically at 122, is mounted in the housing 26 and permits air to be expelled from chamber 121. Thus, the chamber 121 functions as a negative bouncer chamber. However, if valve 122 were changed so that it would permit air to be drawn into chamber 121, then, of course, chamber 121 would function as a positive bouncer chamber.

Another advantage of engine 116 is that the wall 117 isolates the bore 29 from the synchronizer mechanism 76 thereby preventing synchronizer lubricant from leaking into the bore 29, thereby minimizing the chances of contaminating the air in the compressor chamber 68.

FIGURE 6

The engine 123, as shown schematically in FIGURE 6 may be generally similar to the engine 21, both in structure and in mode of operation; however, the engine 123 includes an alternative compressor chamber arrangement which permits high volumetric efficiencies to be achieved by the compressor component of the engine.

The engine 123 includes a wall 124 which prevents communication between the bores 28 and 29. The advantage of the wall 124 is that it prevents oil from the combustion component 22 from leaking into the bore 29 and thereby reducing the chances of contaminating the fluid being compressed in compressor section 23. Furthermore, with the wall 124, the chamber 62 between the piston 46 and the wall 124 may be utilized as a bouncer chamber or, if desired, as a scavenge-pump chamber for the combustion section 22.

In engine 123, a hollow annular member 125 is positioned in the space 126 formed in bore 29 between the inner faces 66 and 127 of the pistons 46 and 128. The piston 128 may be similar in structure to piston 52, although it may have a different construction since it functions as a bouncer piston. Moreover, if desired, the piston 128 need not function as a bouncer piston or for that matter, as a piston at all, but can simply function as a counter-balancing weight and, as such, it can, of course, have various constructions.

The hollow member 125 has a central aperture 129, including a sealing ring, not shown, formed therein through which the shaft 74 may slidably project. However, the central aperture 129 does not communicate with the interior of the member 125.

The member 125 divides the bore 29 into a left portion 131 and a right portion 132 and prevents communication between these portions. Conventional one-way valves, two of which are shown schematically at 133 and 134, are mounted in the housing 26 adjacent the member 125 and permit atmospheric air or any other fluid to be compressed, to be drawn into the portion 131 of the bore 29 when the piston 46 is moving to the left in bore 29, i.e., away from member 125. Conventional one-way valves, two of which are shown schematically at 135 and 136, are mounted in the member 125 adjacent the inner face 66 of the piston 46 and permit compressed air or fluid to be forced into the interior chamber 137 of the member 125 when the piston 128 moves to the right in bore 29, i.e., toward the member 125. The interior chamber 137 of the member 125 communicates with a manifold 138 which directs the compressed air, or fluid, therein away from the engine 123. Thus, in engine 123, the air or fluid is compressed solely by the action of the piston 46, and the piston 128, together with the portion 132 of the bore 29, may either function as a bouncer chamber or the piston 128 may merely function as a movable weight for the purposes of achieving vibrationless operation of the engine. It also should be noted that if desired, the valves 133, 134, 135 and 136 could also be positioned in portion 132 so that this portion, rather than portion 131, would function as the compression chamber.

As noted above, one of the primary advantages of the engine 123 is that the use of member 125 permits the volumetric efficiency of the compressor component of the engine to be significantly increased. This is because the engine may be designed to have an extremely small clearance volume as there is a minimal incidental overstroke of the piston 46 because the return energy, i.e., the energy required to drive piston 45 to the left for the next combustion in chamber 56 may be supplied by the piston 128 functioning as a bouncer piston. By the use of member 125 and the use of piston 128 as a bouncer piston, the size of the compressor clearance volume may be independently varied without affecting the other thermodynamic characteristics of the engine.

Also, as would be expected, the smaller clearance volume and concomitant higher volumetric efficiency of the engine 123 increases valve-opening time and thus the life of the valves utilized in the compressor component of the engine 123. Furthermore, since the valves 135 and 136 are not mounted about the circumference of housing 26, the area available for mounting the valves 133 and 134 and the valves 135 and 136 is optimized. Moreover, this arrangement of the valves 133, 134, 135 and 136 results in less power required for same air-output.

FIGURE 7

The engine 139 is similar to the engine 21, both in structure and mode of operation, except that the engine 139 includes another alternate clearance volume arrangement. In engine 139, a wall 141 is clamped between flanged portions 142 and 143 formed in a housing 140 and this wall 141, like member 125 in engine 124, divides the bore 29 into two separate portions 131 and 132. The wall 141 has a central aperture 144 through which the shaft 74 may slidably project.

The wall 141 and the inner face 67 of the piston 52 define a compressor chamber 145. Conventional one-way valves, one of which being shown schematically at 146, are positioned in the housing 27 adjacent the flange 143 and permit atmospheric air or other fluids to be compressed to be drawn into the compressor chamber 145 while the piston 52 is moving to the right, i.e., away from the wall 141. Other conventional one-way valves, one of which being shown schematically at 147 are positioned in the housing 140 adjacent the flange 143 and permit compressed air or fluid to be discharged from the compressor chamber 145 during the time the piston 52 is moving to the left, i.e., toward the wall 141. Unlike in engine 124, compression of air or fluid, is accomplished entirely by the piston 52 and the piston 46 and the portion 131 of the bore 29 merely function as a bouncer chamber.

The compressor chamber arrangement shown in engine 139 is simpler, from a structural standpoint, than the corresponding compressor chamber arrangement in engine 123, and thus is less expensive to manufacture. Moreover, it should be noted that the portion 131 can be used as the compressor chamber by placing the valves 146 and 147 on the left side of wall 141, and in such a case, the piston 52, of course, could function as a bouncer piston or would not have to function as a piston at all, but merely could be used to balance the engine.

FIGURE 8

As noted above, the principles of this invention are applicable to engines having a plurality of engine cylinders. One example of such an application is engine 186 which includes a first engine cylinder 187 having axially opposed pistons 188 and 189 positioned therein for reciprocal movement. A second engine cylinder 191 is positioned adjacent to engine cylinder 187 so that the central longitudinal axes of the engine cylinders 187 and 191 are substantially parallel. The engine cylinder 191 also has a pair of axially opposed pistons 192 and 193 positioned therein for reciprocal movement. The pistons 188 and 192 may be identical to piston assembly 44 in engine 21 and the pistons 189 and 193 may be identical to piston assembly 51 in engine 21.

A pair of shafts 194 and 195 are fastened at one end to the inner faces 196 and 197, respectively, of the pistons 188 and 192 and slidably project through central apertures 198 and 199 formed in the pistons 189 and 193, respectively. Each of the pistons 189 and 193 has a pair of extensions, one of each pair being shown at 201 and 202, attached to its outer face 203 and 204 thereof. In structure and in mode of operation, each of the engine cylinders 187 and 191 may be identical to the engine 21 shown in FIGURE 1.

A transverse bar 205 is fastened to and carried by the other ends of the shafts 194 and 195. The bar 205, in turn, carries the double-rack block 78 of the synchronizer mechanism 206 which may be identical in structure and mode of operation to the synchronizer mechanism 76, utilized in the engine 21, with the only difference being that the component parts of the mechanism 206 are of larger dimension than the corresponding parts in mechanism 76. The extensions 201 and 202 are part of wall member 93 and are fastened to and carry the racks 96 and 97 of the mechanism 206 so that the teeth of these racks engage the teeth of the pinions 84 and 85. The teeth of the pinions 84 and 85 engage the teeth of the racks 82 and 83 formed on the block 78. As noted above, the synchronizer mechanism 206 functions in the same manner as the mechanism 76 so that movement of the pistons 188 and 192 in one direction causes corresponding movement of the pistons 189 and 193 in the opposite direction.

FIGURES 9-10

Engine 207 is similar in structure and mode of operation to engine 186 except that no part of the force transmitting means which interconnects the pistons 208 and 209 with the synchronizer mechanism 211 penetrates or projects through the axially opposed pistons 212 and 213. Moreover, the pistons 208 and 209 are not similar to the piston assemblies 44 in engine 21 but rather are both interconnected to a single, larger diameter piston 214, as hereinafter described.

More specifically, the engine 207 includes first and second power cylinders 215 and 216 which share a common connecting member 217. Axially opposed pistons 208 and 212 are positioned in power cylinder 215 for reciprocal movement therein and define a combustion chamber 218 therebetween. Likewise, axially opposed pistons 209 and 213 are positioned within power cylinder 216 for reciprocal movement therein and define a combustion chamber 219 therebetween. Shafts 221 and 222 are fastened at one end, to the outer faces 223 and 224 of the pistons 208 and 209, extend to the left from pistons 208 and 209 and are fastened at their other ends to a yoke 225 which extends from the longitudinal central axis of the power cylinder 215, to the longitudinal central axis of the power cylinder 216.

A shaft 226 is attached at one end to the center of the yoke 225 and projects through a bore 227 formed in the connecting member 217. The other end of the shaft 226 is fastened to and carries the double-rack block 78 which is a component of the synchronizer mechanism 211. The synchronizer mechanism 211 may be identical, both in structure and mode of operation, to the synchronizer mechanism 206 of engine 186. The racks 96 and 97 of the mechanism 211 are connected to and carried by the pistons 212 and 213 by means of wall members one of which is shown at 93 and two pairs of extensions, one of each pair being shown at 228 and 229.

Another shaft 231 connects the yoke 225 with the piston 214 and this shaft is axially aligned with shaft 226. As shown in FIGURE 6, the piston 214 is positioned for reciprocal movement in a cylindrical housing 232, with the piston 214 and the housing 232 defining a compressor chamber 233 therebetween. The mode of operation of engine 207 may be basically similar to that of engine 186 and engine 21. However, as noted, engine 207 is particularly adapted to permit chamber 218 and 219 to serve as combustion chambers while utilizing the piston 214 and the housing 232 as the compression component of the engine.

Furthermore, it should be noted that in engine 86 and particularly in engine 207 the engine may comprise more than two power cylinders. Thus, in engine 207, as long as the central longitudinal axes of the power cylinders are all equidistant from the central longitudinal axis of the shaft 226, the only substantial limitation as to the number of power cylinders that may be utilized in the engine 207 is the peripheral space available. The advantage of using multiple power cylinders, particularly when the piston 214 and cylinder housing 232 are utilized as the compressor component of the engine, is that the size of the power cylinders may be correspondingly reduced to reduce the thermal loading of the combustion sections.

CONCLUSION

In view of the foregoing, it is apparent that the invention described herein provides a significant breakthrough in the free piston engine field in that this invention permits free piston engines to achieve the advantages which they have always theoretically had over conventional crank type internal combustion engines of the same class and piston speed. Thus, the utilization of the principles of this invention permit, in contrast to prior engines, considerable freedom in designing free piston engines since the synchronizer and the principal sections of the engine can be designed substantially independently of each other thereby permitting, for any given engine, an optimum design for the engine sections and the synchronizer to be achieved. Because it is believed that the principles of this invention have broad applications, the term "engine" has been used herein in a generic sense so as to include all types of free piston engines, such as free piston compressors and free piston gasifiers.

Of course, it will be apparent to those skilled in the art that many modifications may be made to the synchronization apparatus disclosed and yet remain within the teachings of the present invention. For example, in larger engines, the synchronizer structure may be substantially positioned within and carried by the penetrated piston assembly, that is, the piston assembly corresponding to piston assembly 51 in engine 21. Further, the penetrated piston assembly may have only limited movement within the engine cylinder and in fact, may not, strictly speaking, actually function as a piston.

Moreover, the rack 78 of the synchronizer mechanism 76 in the engine 21 may have more than two racks formed thereon. Of course, each additional rack must engage a separate pinion that in turn engages another rack carried by the adjacent piston assembly 51. Again, the teeth of each rack may project substantially radially outwardly from the central longitudinal axis of the rack so as to provide adequate space for positioning the pinions. The advantage of utilizing more than two racks is that the synchronizer is able to transmit greater forces and/or that if desired, inexpensive, lower quality materials may be utilized in the synchronizer. Furthermore, as another example of a modification of the mechanism 76, the rack 78 and pinions 84 and 85 in mechanism 76 may be replaced by oscillating gear means which engage the racks 96 and 97 and which are connected with the shaft 74. Likewise, the racks 96 and 97 and pinions in mechanism 76 may also be replaced by oscillating gear means which engage the racks 82 and 83 and which are connected with the piston 52. Also, it is obvious that one of the various constructions possible for the counter-balancing movable weight 128 of FIGURE 6 is where there is no separate part and the weight is added to the walls 92, 93, or to the racks 96, 97, or to both.

Thus, since the invention disclosed herein may be embodied in other specific forms without departing from the spirit or central characteristics thereof, the preferred embodiments described herein are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

I claim:

1. In a free piston engine having a pair of opposed reciprocally movable assemblies, at least one of which assemblies is a piston assembly, improved synchronization apparatus for controlling the relative movement of the assemblies and for causing the opposed assemblies to move synchronously in opposite directions in said engine, the apparatus comprising: first motion transmitting means including a shaft which is adapted to have one end attached to one of the opposed assemblies and which has at least two rack means formed thereon, the teeth of each rack means being arranged so as to project outwardly with respect to their central longitudinal axes; second motion transmitting means including at least two rack means which are connected with the other assembly and which are arranged so that each of the rack means are positioned substantially adjacent to and parallel with one of the rack means of the first motion transmitting means so that the teeth of the rack means of the second motion transmitting means project inwardly with respect to their central longitudinal axis and so that each of the adjacent rack means of the first and second motion transmitting means forms an adjacent pair of rack means; connecting means including at least two gear means supported for rotation about axes so that the teeth of the gear means engage the teeth of both rack means of the adjacent pairs of rack means of the first and second motion transmitting means, with the axes of rotation of the gear means being substantially fixed relatively to the first and second motion transmitting means; and frame means, including wall means interconnecting the rack means of the second motion transmitting means, for supporting the rack means of the second motion transmitting means so that movement is prevented between the rack means of the second motion transmitting means and between the rack means of the second motion transmitting means and the frame means and so that the frame means balances the normal components of the forces created by the transmission of forces between the teeth of the rack means of the second motion transmitting means and the teeth of the gear means.

2. In the apparatus described in Claim 1 wherein the wall means include first and second walls which extend substantially adjacent to the sides of the gear means and the rack means of the first motion transmitting means.

3. In the apparatus described in Claim 1 wherein rack means of the first motion transmitting means include first and second racks mounted, on an end of the shaft, wherein the rack means of the second motion transmitting means include third and fourth racks that are supported by the frame means, wherein the gear means of the connecting means include first and second gears and wherein limited, movement of the first and second racks is permitted substantially radially with respect to the first and second gears, the first and second racks inherently seeking the position in which the forces created between the intermeshing teeth of the first and second racks and the first and second gears are minimized.

4. In the apparatus described in Claim 3 wherein the first and second racks of the first motion transmitting means are mounted in back to back relationship on the shaft.

5. In the apparatus described in Claim 3 wherein the wall means are continuous walls; wherein the first and second gears are first and second pinions; and wherein the axes of rotation of the first and second pinions are substantially perpendicular to the longitudinal central axis of the shaft.

6. In the apparatus described in Claim 3 wherein the third and fourth racks can move, relatively, substantially radially, with respect to the first and second gears, the third and fourth racks inherently seeking the position in which the forces created between the intermeshing teeth of the third and fourth racks and the first and second gears are minimized.

7. In the apparatus described in Claim 1 wherein the frame means forms at least a part of the other assembly.

8. Free piston engine apparatus, adapted for transmitting instantaneous differential forces between two assemblies in the engine where the assemblies are arranged to move within the engine housing in opposite directions along parallel axes of movement and where at least one of the assemblies is a piston assembly, comprising:
    (a) first toothed force transmission means, including first and second toothed parts, arranged to form a part of and move with the first moving assembly within the free piston engine housing along an axis of movement parallel to the axis of movement of the first moving assembly;
    (b) second toothed force transmission means, including first and second toothed parts, arranged to form a part of and move with the second moving assembly within the free piston engine housing along an axis parallel to the axis of movement of the second moving assembly;
    (c) third toothed force transmission means, including first and second toothed parts, the first part being in mechanical engagement with the first parts of the first and second toothed means and the second part being in mechanical engagement with the second parts of the first and second toothed means for transmitting instantaneous differential forces applied to the first and second toothed means along the axis of movement of the first and second toothed means between the first and second toothed means for causing relatively opposite movement of the first and second toothed means along their axes of movement;
    (d) means for mounting the third toothed means, the mounting means adapted to be structurally connected to the housing of the free piston engine;
    (e) first rigid means for connecting the parts of the first toothed means to move with the first rigid means for holding the parts fixed with respect to each other such that the normal components of the forces induced within the first rigid means by the engagement of the toothed means are balanced within the first rigid means, the first rigid means and the first toothed means forming at least a part of the first moving assembly; and
    (f) second rigid means for connecting the parts of the second toothed means to move with the second rigid means for holding the parts fixed with respect to each other such that the normal components of the forces induced within the second rigid means by the engagement of the toothed means are balanced within the second rigid means.

9. The free piston engine apparatus of Claim 8, wherein:
    (aa) the first toothed means comprises first gear means having surfaces with gear teeth projecting therefrom;

(bb) the second toothed means comprises second gear means having surfaces with gear teeth projecting therefrom; and (cc) the third toothed means comprises third gear means having curved surfaces with gear teeth projecting therefrom.

10. The free piston engine apparatus of Claim 9, wherein the movement axis of the first gear means and the movement axis of the second gear means are parallel to each other and to the central longitudinal axis of the apparatus, wherein:

(dd) the first and second parts of the first gear means comprise first and second rack means being spaced from each other in directions perpendicular to the apparatus axis with the gear teeth projecting towards each other; and (ee) the first and second parts of the second gear means comprise first and second rack means spaced from each other in directions perpendicular to the apparatus axis with the gear teeth projecting away from each other.

11. The free piston engine apparatus of Claim 10, wherein the first and second parts of the third gear means further comprise first and second pinion means with the first pinion means positioned between the gear teeth of the first rack means of the first gear means and the first rack means of the second gear means and mechanically engaging each of the first rack means and with the second pinion means positioned between the gear teeth of the second rack means of the first gear means and the second rack means of the second gear means and mechanically engaging each of the second rack means.

12. The free piston engine apparatus of Claim 10, wherein the second rigid connection means comprises a block means supporting the rack means of the second gear means, the combination of the block means and the rack means forming multiple rack block means.

13. Free piston engine synchronization apparatus for use as synchronizing and balancing apparatus in a free piston engine where the engine includes a housing and first and second masses movable with respect to the housing and where the apparatus transmits substantially all of the instantaneous differential forces acting upon the first mass and the second mass between the masses for causing movement of the first mass and the second mass along their respective motion axes in opposite parallel directions with respect to each other in a manner that the product of the distance traveled by the first mass multiplied by the first mass equals the product of the distance traveled by the second mass multiplied by the second mass, comprising the combination of:

(a) first and second rack means connected to move with and form a part of the first mass, the first and second rack means adapted for movement along motion axes in directions parallel to the motion axes of the first and second masses, with the teeth of the first and second rack means being directed away from each other;

(b) third and fourth rack means connected to move with and form a part of the second mass, the third and fourth rack means adapted for movement along motion axes in directions parallel to the motion axes of the first and second masses, with the teeth of the third and fourth rack means directed towards each other;

(c) first and second gear means, the first gear means engaging the first rack means and the third rack means and the second gear means engaging the second rack means and the fourth rack means;

(d) means fixedly attached to the free piston engine housing for supporting the first and second gear means for angular motion of the first and second gear means;

(e) first interconnection means, connected to move with the first and second rack means, for holding the first and second rack means fixed with respect to each other for allowing the elimination of sliding contact between the first and second rack means and fixed surfaces within the free piston engine by balancing the normal components of the forces, which are created by the engaging of the first and second gear means and the first and second rack means, within the first interconnection means; and (f) second interconnection means, connected to move with the third and fourth rack means, for holding the third and fourth rack means fixed with respect to each other for allowing the elimination of sliding contact between the third and fourth rack means and fixed surfaces within the free piston engine by balancing the normal components of the forces, which are created by the engaging of the first and second gear means and the third and fourth rack means, within the second interconnection means.

14. The apparatus of Claim 13, wherein the third rack means, the fourth rack means and the second interconnection means form substantially the entire second mass.

15. The apparatus of Claim 13, wherein the first and second gear means comprise first and second pinion means, the first pinion means positioned in engaging relation with the first rack means and the third rack means and the second pinion means positioned in engaging relation with the second rack means and fourth rack means.

16. The apparatus of Claim 15, wherein:

(aa) the first interconnection means comprises block means supporting the first and second rack means, the combination of the block means and the first and second rack means forming double rack block means;

(bb) the means for supporting the pinion means comprises brackets rotatably supporting the first pinion means between the first rack means and the third rack means and rotatably supporting the second pinion means between the second rack means and the fourth rack means; and (cc) the second interconnection means comprises first and second wall means, the wall means the third rack means, and fourth rack means forming a hollow multilateral member.

17. The apparatus of Claim 16, wherein:

(dd) the motion axis of the first rack means, the second rack means, the third rack means, and the fourth rack means are parallel to an axis which is the central longitudinal axis of the apparatus;

(ee) the means for supporting the first and second pinion means comprises:

(1) a pair of parallel brackets, each having first and second faces, immovably attached to the housing of the free piston engine and equally spaced about the apparatus axis with the first face of one bracket being adjacent one side of the double rack block means and the first face of the other bracket being adjacent the other side of the double rack block means to allow free reciprocation of the double rack block means along the central longitudinal axis of the apparatus between the first faces of the brackets; and (2) at least two parallel shafts extending between and supported by the first faces of the pair of brackets and equally spaced about the apparatus axis with one shaft being between the first rack means and the third rack means and other shaft being between the second rack means and the fourth rack means; and (ff) the third and fourth rack means and the first and second wall means comprise a hollow rectangular parallelepiped with the first wall means adjacent the second face of the one bracket and the second wall means adjacent the second face of the other bracket to allow free reciprocation of the parallelepiped along the central longitudinal axis of the apparatus.

18. The apparatus of Claim 17 wherein the parallelepiped forms substantially all of the second mass.